(12) United States Patent
Masumoto et al.

(10) Patent No.: US 12,033,520 B2
(45) Date of Patent: Jul. 9, 2024

(54) SYSTEM FOR ACCESSING AN AIRSPACE

(71) Applicant: TRUEBIZON, LTD., Fukuoka (JP)

(72) Inventors: Mamoru Masumoto, Fukuoka (JP); Kazuki Tomita, Tokyo (JP)

(73) Assignee: TRUEBIZON, LTD., Fukuoka (JP)

( * ) Notice: Subject to any disclaimer, the term of this patent is extended or adjusted under 35 U.S.C. 154(b) by 0 days.

(21) Appl. No.: 17/802,812

(22) PCT Filed: Mar. 4, 2021

(86) PCT No.: PCT/JP2021/008375
§ 371 (c)(1),
(2) Date: Aug. 26, 2022

(87) PCT Pub. No.: WO2021/177395
PCT Pub. Date: Sep. 10, 2021

(65) Prior Publication Data
US 2023/0089262 A1    Mar. 23, 2023

(30) Foreign Application Priority Data
Mar. 5, 2020    (JP) .................................. 2020-037390

(51) Int. Cl.
*G08G 5/00*    (2006.01)
(52) U.S. Cl.
CPC ........... *G08G 5/003* (2013.01); *G08G 5/0069* (2013.01)
(58) Field of Classification Search
CPC .............................. G08G 5/003; G08G 5/0069
See application file for complete search history.

(56) References Cited

U.S. PATENT DOCUMENTS

| | | | |
|---|---|---|---|
| 2014/0018979 A1* | 1/2014 | Goossen | G08G 5/0034 701/3 |
| 2016/0117931 A1* | 4/2016 | Chan | G08G 5/0043 701/120 |
| 2019/0147751 A1 | 5/2019 | Sasao | |

(Continued)

FOREIGN PATENT DOCUMENTS

| | | |
|---|---|---|
| CN | 109416889 A | 3/2019 |
| EP | 3422325 A1 | 1/2019 |
| JP | 2009-205652 A | 9/2009 |

(Continued)

OTHER PUBLICATIONS

English translation of International Search Report mailed on Jun. 8, 2021 in PCT/JP2021/008375, Japan, 2 pages.

(Continued)

*Primary Examiner* — Hongmin Fan
(74) *Attorney, Agent, or Firm* — United IP Counselors, LLC

(57) ABSTRACT

To provide an information processing device, an information processing method, and storage medium that realize assessment of an airspace. An information processing device for assessing an airspace includes: a first acquisition unit that acquires a status of an airspace; and an assessment unit that assesses at least one of values and risks of the airspace according to the status of the airspace acquired by the first acquisition unit by referring to information which is for assessing at least one of values and risks of an airspace and associated with a status of the airspace.

17 Claims, 14 Drawing Sheets

(56) References Cited

U.S. PATENT DOCUMENTS

2021/0072423 A1    3/2021   Yoshikawa et al.
2021/0089056 A1    3/2021   Masumoto

FOREIGN PATENT DOCUMENTS

| | | |
|---|---|---|
| JP | 2019-045403 A | 3/2019 |
| JP | 6517972 B1 | 5/2019 |
| JP | 2019-096332 A | 6/2019 |
| JP | 2019-101451 A | 6/2019 |
| WO | 2017/180994 A1 | 10/2017 |
| WO | 2017/216854 A1 | 12/2017 |
| WO | 2019/049601 A1 | 3/2019 |
| WO | 2019/077694 A1 | 4/2019 |
| WO | 2019/079286 A1 | 4/2019 |
| WO | 2019/148188 A1 | 8/2019 |
| WO | 2019/181867 A1 | 9/2019 |

OTHER PUBLICATIONS

Extended European Search Report mailed on Mar. 14, 2024 in a corresponding European Patent Application No. 21763539.0 (9 pages).

* cited by examiner

FIG. 4

| MAJOR ITEM | MINOR ITEM | VALUE POINTS | RISK POINTS |
|---|---|---|---|
| USE TYPE | AERIAL PHOTOGRAPHY | 5 | 4 |
| | AGRICULTURE | 3 | 3 |
| | TRANSPORTATION | 3 | 3 |
| GEOGRAPHIC TYPE | RESIDENTIAL AREA | 3 | 5 |
| | FOREST | 4 | 1 |
| ... | ... | ... | ... |
| | ... | ... | ... |
| | ... | ... | ... |

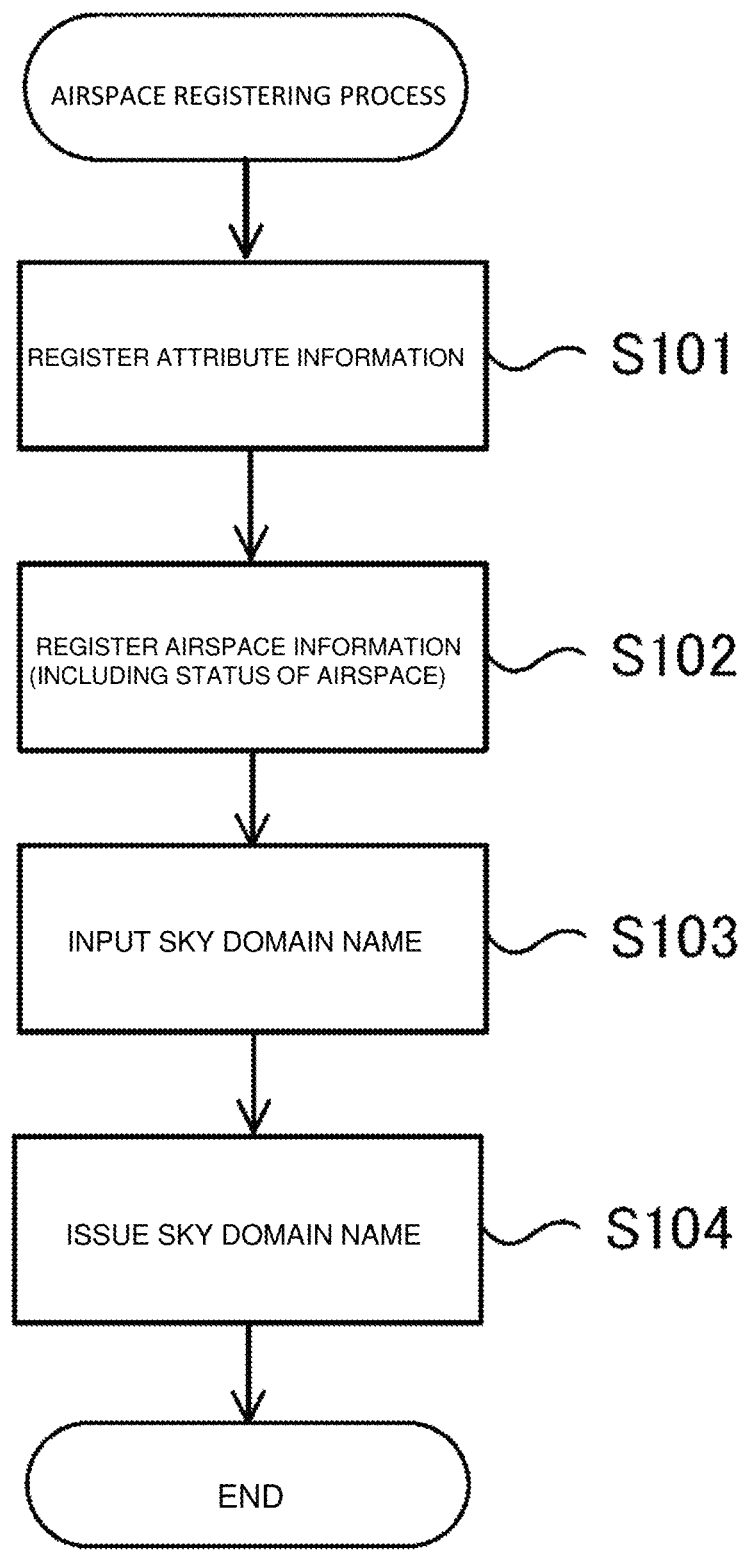

FIG. 14

| MAJOR ITEM | MINOR ITEM | VALUE POINTS | RISK POINTS |
|---|---|---|---|
| SIZE | LARGE | 5 | 4 |
| | MEDIUM | 3 | 3 |
| | SMALL | 3 | 3 |
| BODY WEIGHT | LESS THAN 1KG | 3 | 5 |
| | 1KG OR MORE | 4 | 1 |
| ⁞ | ... | ... | ... |
| | ... | ... | ... |
| | ... | ... | ... |
| THE NUMBER OF ROTERS | 1 | 1 | 5 |
| | 2-3 | 3 | 3 |
| | 4 OR MORE | 5 | 1 |
| ⁞ | ... | ... | ... |
| | ... | ... | ... |
| | ... | ... | ... |

SYSTEM FOR ACCESSING AN AIRSPACE

CROSS-REFERENCE TO RELATED APPLICATIONS

This application is a National Stage Entry application of PCT International Application No. PCT/JP2021/008375, filed on Mar. 4, 2021, which claims the priority benefit of Japanese Patent Application No. 2020-037390, filed on Mar. 5, 2020, the entire contents of both of which are hereby incorporated by reference.

BACKGROUND

1. Technical Field

The present invention relates to an information processing device, an information processing method, and a storage medium.

2. Description of the Background

Unmanned aerial vehicles (hereinafter referred to also as drones) are increasingly used in various fields as their performance improves. With this increased use, a number of techniques related to drones have been proposed. For example, JP 2019-077694 A1 (hereinafter referred to as "Patent Literature 1") proposes a technique of correcting the flight of a drone for counteracting the effect of wind, including flying, around a first drone on which the effect of wind is to counteract, at least one second drone. The flight of the first drone is corrected according to information on wind (wind speed or wind direction) obtained by the second drone.

JP 2019-096332 A (hereinafter referred to as "Patent Literature 2") discloses a technique of flying a drone avoiding a flight prohibited region, including acquiring mobile positional information on the current position of a drone. Region setting means sets a flight prohibited region where the flight of an unmanned aerial vehicle is prohibited, according to the mobile positional information.

BRIEF SUMMARY

However, most conventional techniques have focused on the technology of drones themselves, with few proposals regarding airspaces in which drones fly.

The present invention has been made in view of the foregoing, and an object thereof is to provide an information processing device, an information processing method, and a storage medium that realize assessment of an airspace.

In order to solve the problem, an information processing device of the present invention is an information processing device for assessing an airspace, including: a first acquisition unit that acquires a status of an airspace; and an assessment unit that assesses at least one of values and risks of the airspace according to the status of the airspace acquired by the first acquisition unit by referring to information which is for assessing at least one of values and risks of an airspace and associated with a status of the airspace.

The present invention provides an information processing device, an information processing method, and a storage medium that realize assessment of an airspace.

BRIEF DESCRIPTION OF DRAWINGS

FIG. 4 is an example of an airspace assessment table stored in the storage device of the information processing server according to the embodiment.

FIG. 8 is a flowchart of an example of an airspace registering process in the information processing system according to the embodiment.

FIG. 14 is an example of an air vehicle assessment table stored in a storage device of an information processing server according to a variation 1 of the embodiment.

DETAILED DESCRIPTION

In the following, with reference to the drawings, a description will be given of an embodiment of the present invention. In the following description, an "airspace" means the three-dimensional space specified by latitude, longitude, and altitude. An "airspace assessment" means an assessment of at least one of the risks and values of an airspace. An "air vehicle assessment" means an assessment of at least of one of the risks and values of an air vehicle that uses (or flies through) an airspace. While an "air vehicle" is described as an unmanned aerial vehicle (UAV) in the following, it is not intended to exclude a manned aerial vehicle.

Embodiment

Figure 1:
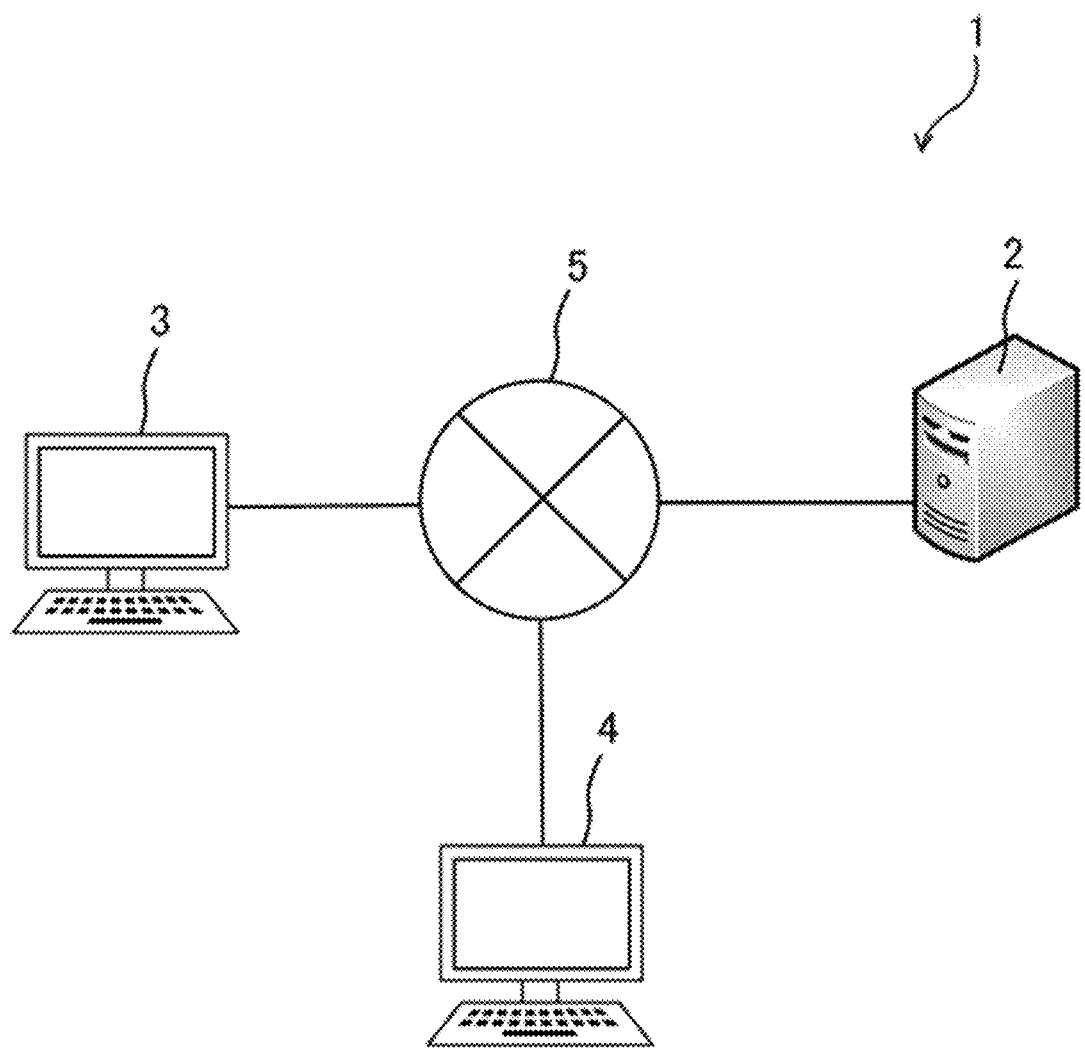
FIG. 1 is a schematic configuration diagram of an information processing system according to an embodiment.

Firstly, with reference to FIG. 1, a description will be given of the configuration of an information processing system 1. The information processing system 1 includes an information processing server 2 (information processing device), a user terminal 3 and a user terminal 4 (hereinafter the user terminal 3 and the user terminal 4 may be referred to also as the user terminals 3, 4) connected to the information processing server 2 via a network 5. In FIG. 1, while the information processing system 1 includes one information processing server 2, one user terminal 3, and one user terminal 4, the information processing system 1 may include any number of information processing server 2 and user terminals 3, 4. While not shown in FIG. 1, the information processing server 2 is also connected via the network 5 to other devices such as a web server that stores weather information.

The user terminal 3 is a terminal for a landowner or a naming right holder to apply for registration of an airspace. When an airspace is registered, the information processing server 2 issues a sky domain that identifies the airspace. The user terminal 4 is a terminal for applying for use of an airspace. In the description of the present embodiment, while the user terminal 3 is the terminal used to apply for registration of airspace and the user terminal 4 is the terminal used to apply for use of an airspace, the user terminals 3, 4 can each be used in applying for both registration and use of an airspace.

Information Processing Server 2

Figure 2:
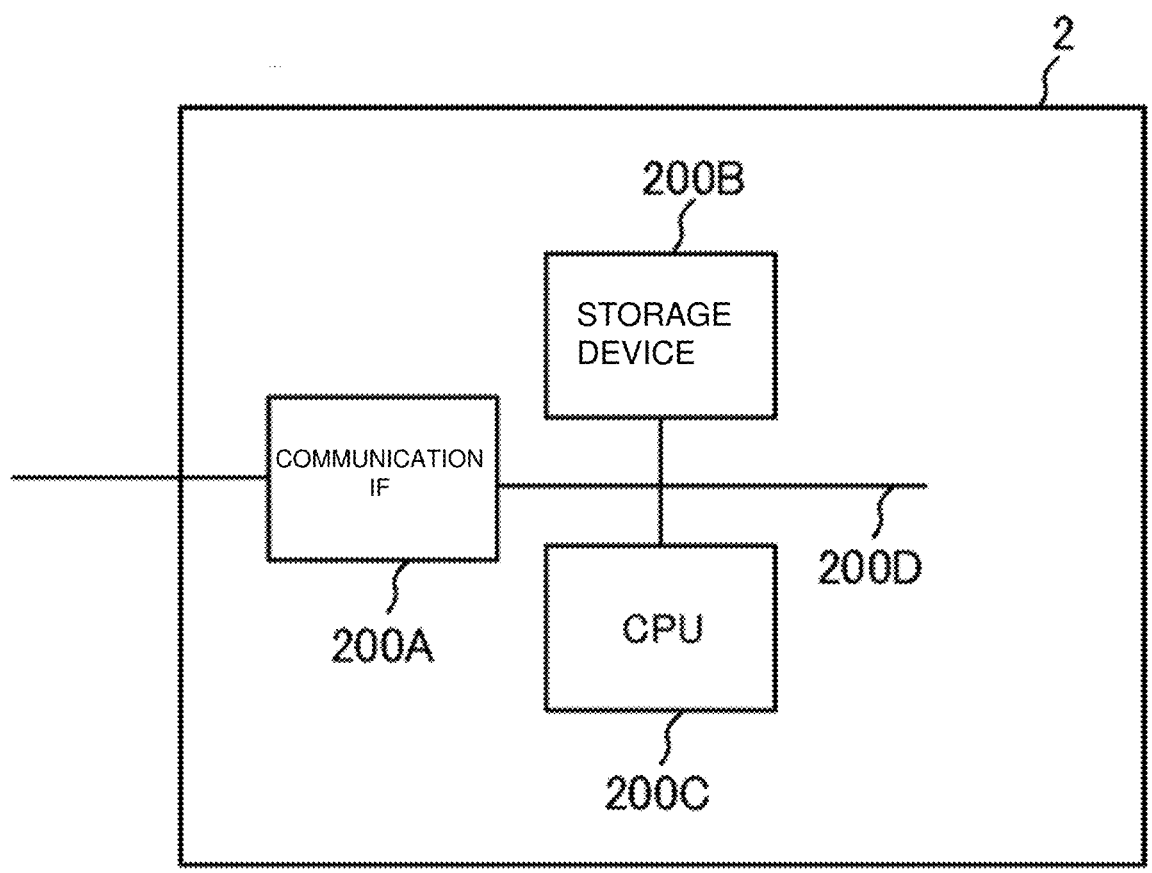
FIG. 2 is a configuration diagram of an information processing server according to the embodiment.

FIG. 2 is a configuration diagram of the information processing server 2.

FIG. 2 shows the main hardware configuration of the information processing server 2. In the information processing server 2, a communication IF 200A, a storage device 200B, and a CPU 200C are connected via a bus 200D.

The communication IF 200A is an interface for establishing communication with other devices (the user terminals 3, 4 in the present embodiment).

The storage device 200B is, for example, an HDD (Hard Disk Drive) or a semiconductor storage device (SSD (Solid State Drive)). The storage device 200B stores various information and information processing programs.

Figure 3:
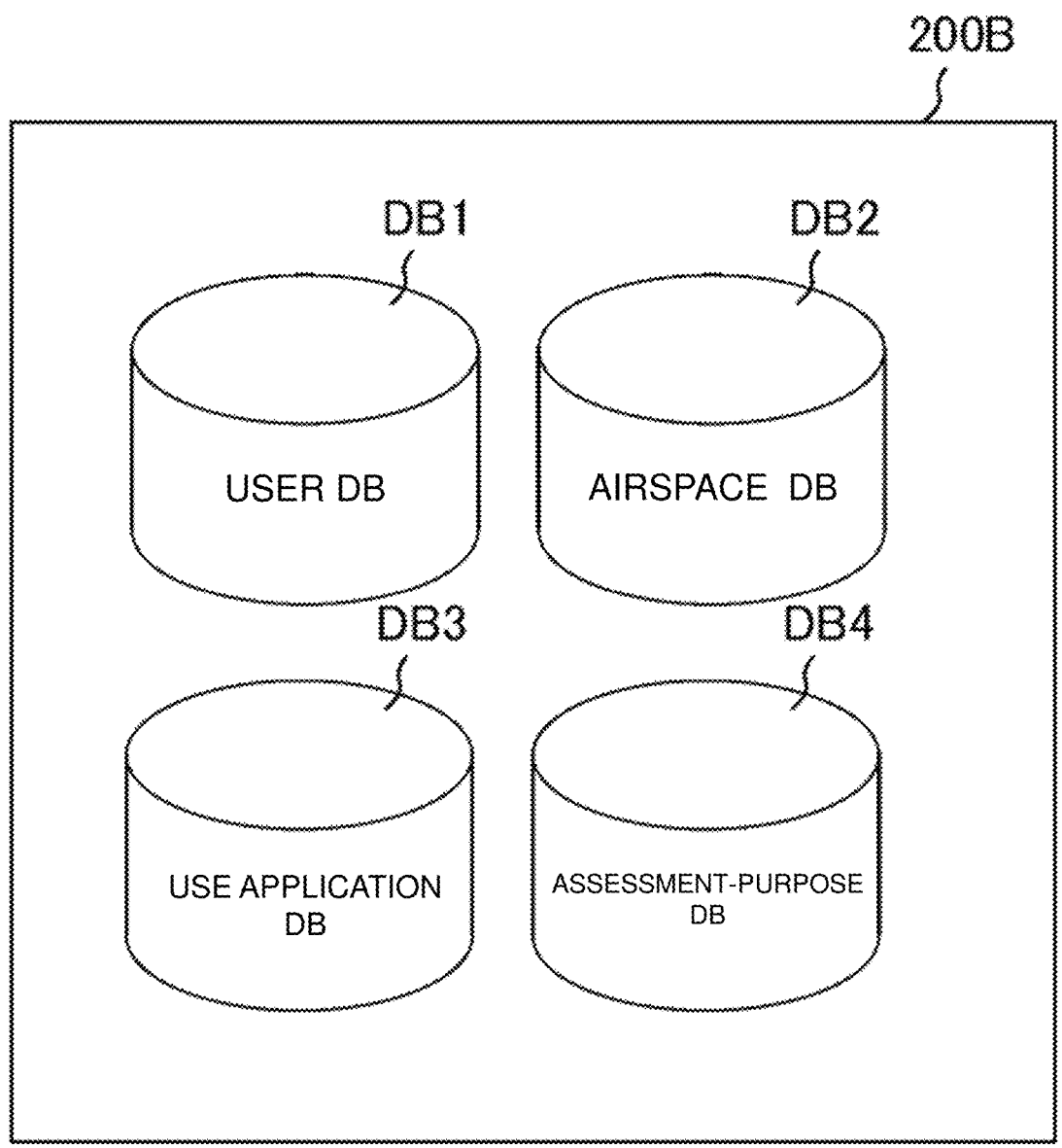
FIG. 3 is an example of databases stored in a storage device of the information processing server according to the embodiment.

FIG. 3 is an example of databases (hereinafter referred to also as the DBs) stored in the storage device of the information processing server 2. As shown in FIG. 3, the storage device 200B stores databases such as a user DB 1, an airspace DB 2, a use application DB 3, and an assessment-purpose DB 4, and information processing programs. Note that, the information can be stored in the storage device 200B in any manner and the databases may not necessarily be the user DB 1, the airspace DB 2, the use application DB 3, and the assessment-purpose DB 4. The information may not even be stored in a database format.

User DB 1

The user DB 1 stores user information. More specifically, the user DB 1 stores information on an airspace registrant such as a landowner or a naming right holder (hereinafter referred to also as the registered user) and a user who uses an airspace (hereinafter referred to also as the using user) in association with their respective user IDs. The information associated with the user ID of a registered user includes account name, authentication password, mail address, name, postal address, gender, phone number, date of birth and others (hereinafter referred to also as the attribute information), and information on the airspace for which registration is applied (e.g., airspace identification information).

The information associated with the user ID of a using user includes, for example, in addition to the attribute information such as account name, authentication password, mail address, name, postal address, gender, phone number, and date of birth, licenses that the user holds, usage time, and usage history information (usage log) such as an air vehicle usage area (e.g., the identification information on the airspace that the user used in the past). A usage history DB may be provided so that the usage history of a using user is stored in association with his/her user ID.

The information associated with a user ID described here is only an example, and any information may be stored in the user DB 1 in association with the user ID of a registered user or a using user.

Airspace DB 2

The airspace DB 2 stores airspace information. While not shown in FIG. 3, the airspace DB 2 further includes a land DB 2a, a sky polygon DB 2b, a sky domain DB 2c, and a sub-domain DB 2d.

In association with a land ID, the land DB 2a stores the name of a land, prefectural location of the land, the latitude, longitude, and elevation of a representative point, operational hours, license information, price (charge price/selling price), a sky domain ID and others.

In association with a sky polygon ID, the sky polygon DB 2b stores a sky domain ID and the latitude, longitude, and elevation of a representative point.

In association with a sky domain ID, the sky domain DB 2c stores a user ID, the zip code, prefecture, and postal address of a land where an airspace exists, the latitude, longitude, and elevation of a representative point, the land type (use type, geographic type), area measurements, whether the information is public or private, and a sky domain.

Here, the sky domain is described. The sky domain consists of: a top sky domain as the first domain information; a second sky domain (area level) as the second domain information; a third sky domain as the third sky domain information; and a fourth sky domain (sub-domain) as the fourth sky domain information.

The following is an exemplary sky domain:
space1:example:fo: sky
In the example, "space1" is the fourth sky domain information; "example" is the third sky domain information; "fo" is the second sky domain information; and "sky" is the first sky domain information.

Each portion of the sky domain separated by colons (:) is referred to as a label. In the present embodiment, the length of one label can be defined by 63 or less characters including lowercase alphabets "a" to "z", numerical numbers "0" to "9", and a hyphen. Each label may have any length (the number of characters) and use any type of characters or signs. For example, uppercase alphabets may be used. It may or may not be case sensitive.

In the present embodiment, while the top sky domain in Japan is "sky" in principle, there are other reserved domains such as "air", "sora", or "space". The second sky domain should be the abbreviation of prefectures (e.g., tk for Tokyo, fo for Fukuoka). Based on the area information of the registered user, the information processing server 2 specifies the top sky domain as the first domain information and the second sky domain (area level) of the second domain information.

In the present embodiment, a registered user can set (acquire) any third sky domain. With a top-level domain without the second sky domain, a registered user can set (acquire) any second sky domain. This corresponds to .com or .net in DNS of the internet. The fourth sky domain is also referred to as a sub-domain and the owner of the third sky domain can determine any fourth sky domain.

In the present embodiment, the information processing server 2 functions as a main server device and an SDNS server device. When the information processing server 2 is physically separated into the main server device and the SDNS (Sky Domain Name Server) server device, the main server device may manage the SDNS server device regarding the management and operation of the sky domain, and the SDNS server device may manage the correspondence between the sky domain name and the sky address and the data of the sub-domain.

Regarding an airspace registered in association with a sky domain, in the present embodiment, the user terminal 3 displays on its window the map of the property for which registration has been applied. The registered user enters (plots) three or more arbitrary points to surround the property on the window. According to the information of the plotted points, the information processing server 2 forms a land area and creates a polygon. The land area is three-dimensional up to a predetermined height (in the present example, 300 m). The information processing server 2 designates this three-dimensioned area as an airspace and associates it with a sky domain.

In the present embodiment, any sub-domain can be set in the airspace of the sky domain. For example, a space up to a specified height or a three-dimensional "tube" representing the available range in detail may be created. The regions of the sub-domains may or may not overlap with each other. Unless they are totally identical spaces (three-dimensional polygon groups), they may overlap with each other. However, depending on the purpose of use, their simultaneous use is not allowed.

The tube is the space surrounded by lines connecting straight between an entrance plane (four-point entrance sky address) and an exit plane (four-point exit sky address) of the airspace. The entrance plane (four-point entrance sky address) and the exit plane (four-point exit sky address) of the airspace are stored in the sub-domain DB 2d as area information which will be described later. While an airspace shape of a curved surface or a sphere is not defined in the present embodiment, it may be defined if necessary.

The sub-domain DB 2d stores a sky domain ID and area information in association with each sub-domain ID. The area information is information for specifying an airspace by the above-described tube. Specifically, the area information is the information (latitude, longitude, and altitude) of the entrance plane (four-point entrance sky address) and the exit plane (four-point exit sky address) of an airspace.

In the present embodiment, the status of an airspace is stored in the airspace DB 2 in association with a sky domain ID (airspace). In the following, items included in the status of an airspace will be described. These items are illustrative and any item can be stored in the airspace DB as the status of an airspace in association with a sky domain ID (airspace). It is not necessary for a registered user to register every item of the status of an airspace; the registered user may register some of the items, and the administrator of the information processing system 1 or the information processing server 2 may register the remaining items.

(1) Use Type

Use type is information on the type of airspace usage, such as aerial photography, agriculture, transportation (e.g., of people and cargo), official use, and leisure use. The land type (use type) information stored in the sky domain DB 2c may be used.

(2) Geographic Type

Geographic type is information on the type of a land on which an airspace is set, such as a residential area, a plain, a field, a forest, or a populated area (population density may be used). The land type (geographic type) information stored in the sky domain DB 2c may be used.

(3) Environmental Status

Environment is airspace information that is more constant than the weather status described later, such as the presence/absence of obstructions (any architecture and natural objects that obstruct the flight of air vehicles including buildings, pylons, and mountains) and special facilities (airports for air vehicles, military facilities). In addition, the environmental status may include: the presence/absence or magnitude of wind pressure due to seasonal factors; the presence/absence and scale of dust; the degree of impact on the ecosystem; the impact of air vehicles' flight on the privacy of residents; and the connectivity with ground transportation; the environmental impact, the residents' acceptance (such as residents' understanding), and threats (such as noise and exhaust gas) of air vehicles' flight. The residents' understanding may be a numerical value derived by substituting, into a predetermined formula, the opinions of the landowners or naming right holders of an airspace by a predetermined percentage (e.g., 10-20%) and the opinions of the neighborhood by the remaining percentage. The presence/absence or magnitude of wind pressure due to seasonal factors and the presence/absence and scale of dust may be included in the following meteorological status.

(4) Meteorological Status

Meteorological status is airspace information that is temporary compared to the environmental status described above, such as the temperature, wind speed, wind direction, humidity, and precipitation of an airspace. The meteorological status is updated by the meteorological status obtained by the information processing server 2 described later.

(5) Utilization Status

Utilization status is two-dimensional or three-dimensional airspace information such as the number of use applications for an airspace, the number of air vehicles (traffic and logistics) that use an airspace, the use time period of an airspace (the use time period includes information on dates and hours (e.g., from what time and minute and second of what day of what month of what year to what time and minute and second of what day of what month of what year)). The utilization information may include whether an airspace is available for VIPs with priority. The utilization status is updated regularly or irregularly.

(6) Radio Wave Status

Radio wave status is information such as radio wave strength, frequencies, and radio wave certifications (by the telecommunication carriers providing the radio wave lines such as docomo, au, Softbank, and Rakuten).

(7) Airport Information

Airport information is used when there is any airport nearby, and may include the controlled airspace class and restricted surface class of an airspace and a target airport code.

(8) Flight Rules

Flight rules are flight rule information set by the national government, local governments and others, such as: permission/prohibition on night flights, out-of-sight flights, flights over events, hazardous materials transportations, and object drops; the minimum basic flight altitude, the maximum basic flight altitude, and the maximum land ownership altitude; whether liability insurance is mandatory or optional; the minimum liability insurance coverage; and the payload capacity.

(9) Statistical Information

Statistical information is information such as how many times an airspace has been used in the past (e.g., the number of flights, arrivals, and departures of air vehicles), the number and type of accidents (e.g., bird strike, radio interference and others). In general, as the registration period becomes longer, the number of uses and accidents increases. Therefore, for example, the average of the number of uses and accidents over a given period, such as per month or year, may be used. The statistical Information is updated regularly or irregularly.

(10) Others

Others is information not covered by (1) to (9), such as price (charge price/selling price). The price may be the price (charge price/selling price) stored in the land DB 2a.

Use Application DB 3

The use application DB 3 stores information on airspace use applications by using users. More specifically, the use application DB 3 stores, in association with the using user's ID, information such as an airspace for which use is applied, the purpose of use (aerial photography, agriculture, transportation and others), use time period, air vehicle and the like. Here, the information on an air vehicle includes, for example, the identification information of the air vehicle (air vehicle ID), its body size (size) and the number of rotors, the weight of its body (dry weight), the payload (payload) and others), the attribute, and the type of load (e.g., whether it is a specified dangerous goods or not).

Assessment-Purpose DB 4

The assessment-purpose DB 4 stores information which is for assessing at least one of the values and risks of an airspace and associated with the status of the airspace (hereinafter referred to also as the assessment information). FIG. 4 is an example of the assessment information stored in the assessment-purpose DB 4. As shown in FIG. 4, the assessment information is a data table in which values and risks are associated with each item of the status of an airspace (hereinafter referred to also as the assessment table). Specifically, (1) Use type, (2) Geographic type, (3) Environmental status, (4) Meteorological status, (5) Utilization status, (6) Radio wave status, (7) Airport information, (8) Flight rule, (9) Statistical information, and (10) Others each have a major item and minor items, and points of values and risks (hereinafter referred to also as the value points and the risk points) are associated. The airspace assessment is carried out by acquiring the points of minor items corresponding to the actual status of an airspace for each major item. For example, when the use type (major item) is aerial photography (minor item), 5 and 4 points are acquired as the corresponding value points and risk points, respectively. In the present embodiment, the value points and the risk points are set so that their being higher means higher values and risks. Here, the value points and the risk points may be set so that their being lower means higher values and risks.

In the assessment table, the points may be set so that any official use is given lower value points and any leisure use is given higher value points. The points in the assessment table may be set so that a higher number of use applications is given higher value points and a smaller number of use applications is given lower value points. The points in the assessment table may be set so that a number of use applications exceeding a predetermined number per predetermined range (e.g., 100 cubic meters) is given higher risk points.

In the present embodiment, the values and risks of an airspace is assessed by providing the assessment table which is the information for assessing at least one of the values and risks of an airspace and associated with the status of the airspace. Here, it is sufficient if at least one of the values and risks of an airspace can be assessed according to the status of the airspace, and therefore the values and risks of an airspace may be assessed by another scheme. For example, it is also possible to provide a data table where coefficients are associated for each item of the status of an airspace, and a given constant may be multiplied by the coefficients.

The information processing server 2, which will be described later, refers to the assessment table stored in the assessment-purpose DB 4, and according to the status of an airspace registered in the airspace DB 2, the information processing server 2 acquires the value points and risk points of the corresponding minor item for each major item of the status of an airspace. Then, the information processing server 2 adds up the acquired value and risk points to assess the airspace. The added value points and risk points may be standardized (e.g., on a 100-point scale). Alternatively, as described above, a data table where coefficients are associated for each minor item may be provided; after the coefficients of the values and risks of the corresponding minor item for each major item of the status of an airspace are acquired, a given value may be multiplied by the acquired coefficients.

Various information stored in the storage device 200B (e.g., information stored in the user DB 1, the airspace DB 2, the use application DB 3, and the assessment-purpose DB 4) may be partially or entirely stored in an external storage device such as a USB (Universal Serial Bus) memory or an external HDD or a storage device of other information processing device connected via the network 5. In this case, the information processing server 2 refers to or acquires the various information stored in the external storage device or the storage device of other information processing device.

The CPU 200C controls the information processing server 2 according to the present embodiment, and includes ROM, RAM and others which are not shown.

Figure 5:
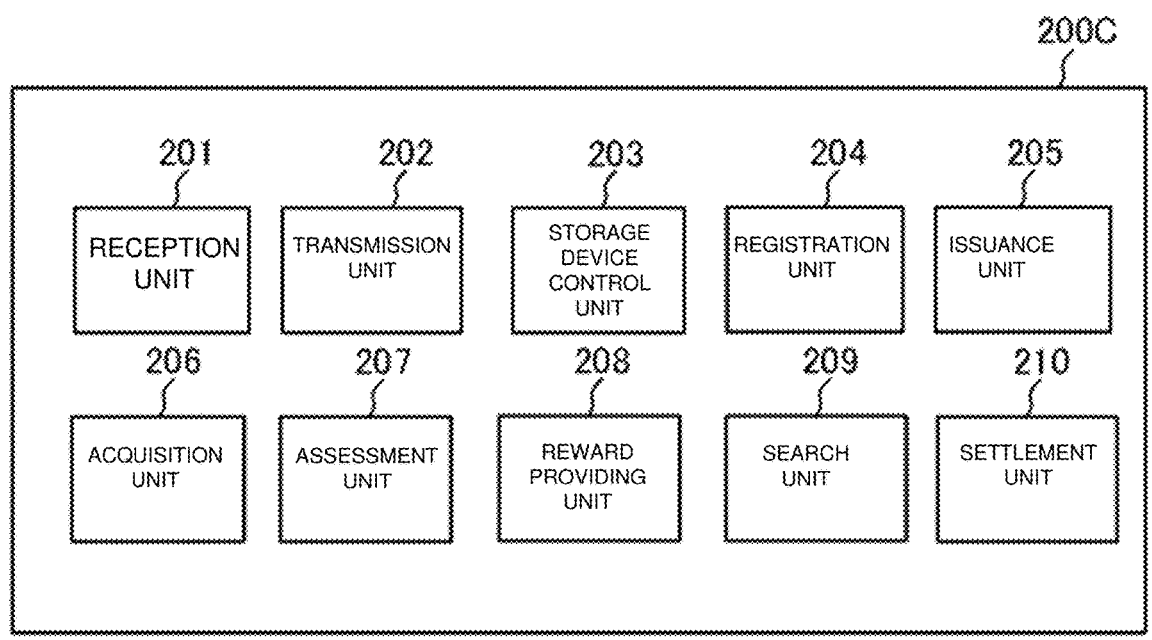
FIG. 5 is a functional block diagram of the information processing server according to the embodiment.

FIG. 5 is a functional block diagram of the information processing server 2. As shown in FIG. 5, the information processing server 2 includes functions such as a reception unit 201 (acceptance unit), a transmission unit 202, a storage device control unit 203, a registration unit 204, an issuance unit 205, an acquisition unit 206 (first to fourth acquisition units), an assessment unit 207, a reward providing unit 208, a search unit 209, and a settlement unit 210.

The functions in FIG. 5 are realized by the CPU 200C executing information processing programs stored in the storage device 200B.

The reception unit 201 (acceptance unit) receives information transmitted from at least one of the user terminals 3, 4, the web server and others via the network 5.

The transmission unit 202 transmits information to at least one of the user terminals 3, 4 via the network 5.

The storage device control unit 203 controls the storage device 200B. Specifically, the storage device control unit 203 writes and reads information to and from the storage device 200B.

According to the information transmitted from the user terminals 3, 4, the registration unit 204 registers information of the registered user and the using user in the user DB 1. According to the information transmitted from the user terminal 3, the registration unit 204 registers the status of an airspace in the airspace DB 2. Furthermore, according to the information transmitted from the user terminal 4, the registration unit 204 registers information on a use application in the use application DB 3.

The issuance unit 205 issues a sky domain. Specifically, the issuance unit 205 issues a sky domain in response to a domain issuance request from the user terminal 3. In more detail, when the user terminal 3 transmits at least area information and the third and fourth domain information, the issuance unit 205 issues a sky domain in which: the first domain information is a predetermined character string; the second domain information is a character string corresponding to the area information; and the third and fourth domain information are each a character string transmitted from the information terminal.

The acquisition unit 206 acquires, for example, the following information:

(1) The status of a registered airspace;
(2) The meteorological status of an airspace;
(3) The positional information of an air vehicle that uses an airspace;
(4) The departure and destination positional information of an air vehicle that uses an airspace; and
(5) The information on an air vehicle.

The acquisition unit 206 periodically (every predetermined period of time from several seconds to several tens of seconds) acquires (3) air vehicle's positional information. The acquired air vehicle's positional information is stored in the user DB 1 as usage history information in association with the user ID of a using user. The acquisition unit 206 acquires any meteorological information from an accessible website, for example. The positional information of an air vehicle may be acquired as follows: an air vehicle has an IC card or the like storing a body number unique to the air vehicle (air vehicle ID) inserted, and its air vehicle ID and positional information are transmitted (for example using GPS) to the air vehicle. Thus, the air vehicle is identified and its positional information is acquired. While the acquisition unit 206 periodically acquires the meteorological status and the air vehicle's positional information, the period (predetermined period) of acquiring the meteorological status and the air vehicle's positional information can be set to any length so long as it falls within a practical range.

The assessment unit 207 assesses the values and risks of an airspace according to the status of the airspace acquired by the acquisition unit 206 by referring to the assessment table stored in the assessment-purpose DB 4. More specifically, the assessment unit 207 refers to the assessment table stored in the assessment-purpose DB 4. The assessment unit 207 acquires the value points and risk points of the corresponding minor item for each major item of the status of an airspace according to the status of the airspace acquired by the acquisition unit 206. Then, the assessment unit 207 adds up the acquired value points and risk points to derive the value points and the risk points and thus assesses the airspace.

The reward providing unit 208 provides a reward (such as points) to an airspace according to the number of pieces of periodical positional information (the number of plots, which will be described with reference to FIG. 6) of an air vehicle acquired by the acquisition unit 206. The positional information includes latitude, longitude, and elevation, time (the time point at which the positional information is acquired), and an air vehicle ID. In the present embodiment, the system refers to the user DB 1, identifies the user ID of a using user through use of an air vehicle ID, and charges the usage fee to the identified using user. In charging the usage fee, a donation to a fund such as an environmental conservation organization (can be a non-profit or for-profit organization) may be added to the usage fee.

Figure 6:
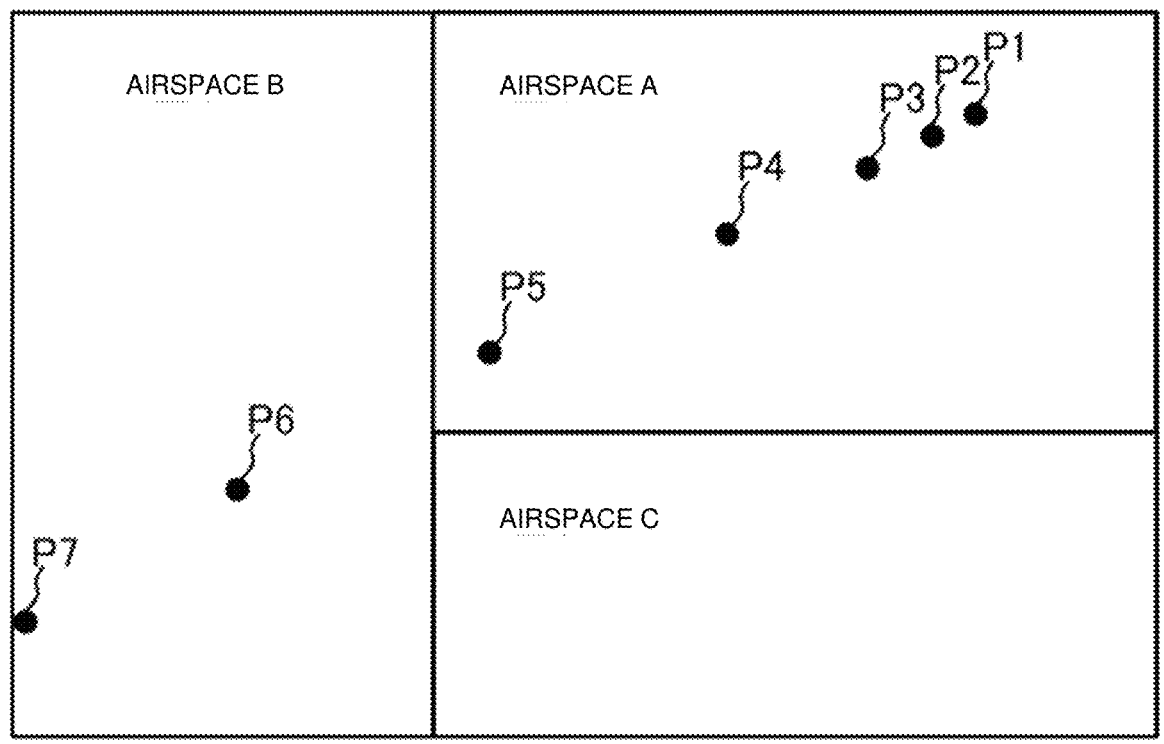
FIG. 6 shows one example of the usage history of airspaces.

FIG. 6 shows one example of a usage history obtained by plotting positions P1 to P7 of an air vehicle periodically acquired by the acquisition unit 206. FIG. 6 shows an exemplary usage history obtained by plotting the position of an air vehicle starting from an airspace A and passing through an airspace B to reach another place. Normally, an air vehicle ascends, then gradually increases its speed and transitions to a constant speed flight. Therefore, in the air vehicle's position plotting, the intervals are short from P1 to P4 in the airspace A right after starting the flight. Then, as the air vehicle transitions to the constant speed flight, the air vehicle's positions are plotted at regular intervals at P6 in the airspace A and from P6 to P7 in the airspace B. Since the air vehicle is not using an airspace C, no plotting is done in the airspace C. Here, in the present embodiment, the number of plots in each airspace is used as the periodical positional information of an air vehicle acquired by the acquisition unit 206. That is, in the present embodiment, a reward is given according to the time spent in using an airspace and the values and risks of the airspace. FIG. 6 is the positional information history (plots) of an air vehicle travelling from point A to point B for a reason such as transporting cargo. For other use type such as crop dusting, the history of the air vehicle's positional information will be different.

As described above, using the periodic positions (plots) of an air vehicle acquired by the acquisition unit 206, a reward can be given for the time spent in using an airspace by the simple scheme of counting the number of plots in the airspace without the necessity of calculating the actual usage time in the airspace. Similarly, the simple scheme of counting the number of plots in an airspace realizes charging the usage fee to the using user of the airspace.

The reward provided to the airspace may be redeemable for money at a later time. By keeping the history (plots) of an air vehicle's positional information in an airspace, it becomes possible to deal with a case where an airspace without a registered user is used. That is, when the landowner or naming right holder of a land where such an airspace is set is identified, the reward granted based on the number of plots in the airspace can be redeemed for money and given to the identified landowner or naming right holder. The reward may be managed in a blockchain to protect against tampering and enhance reliability.

The search unit 209 searches for an airspace recommended for use according to the departure and destination positional information of an air vehicle that uses an airspace accepted by the reception unit 201, the status of an airspace, and at least one of the values and risks of an airspace assessed by the assessment unit 207.

The settlement unit 210 executes the settlement of usage fees. Specifically, when a using user applies for use of an airspace, a predetermined usage fee is collected from the using user through electronic settlement. The settlement unit 210 deducts the brokerage fee from the payment and pays the remaining amount to the registered user of the used airspace through electronic settlement. This settlement method is illustrative, and the airspace billing of using users is not limited thereto.

User Terminals 3, 4

The user terminal 3 is a terminal for a user of the information processing system 1 to register an airspace. The user terminal 4 is a terminal for a user of the information processing system 1 to apply for use of an airspace. In FIG. 1, the user terminals 3, 4 are desktop PCs (Personal Computers). Here, the user terminals 3, 4 may be notebook PCs, tablet PCs, or smartphones.

Figure 7A:
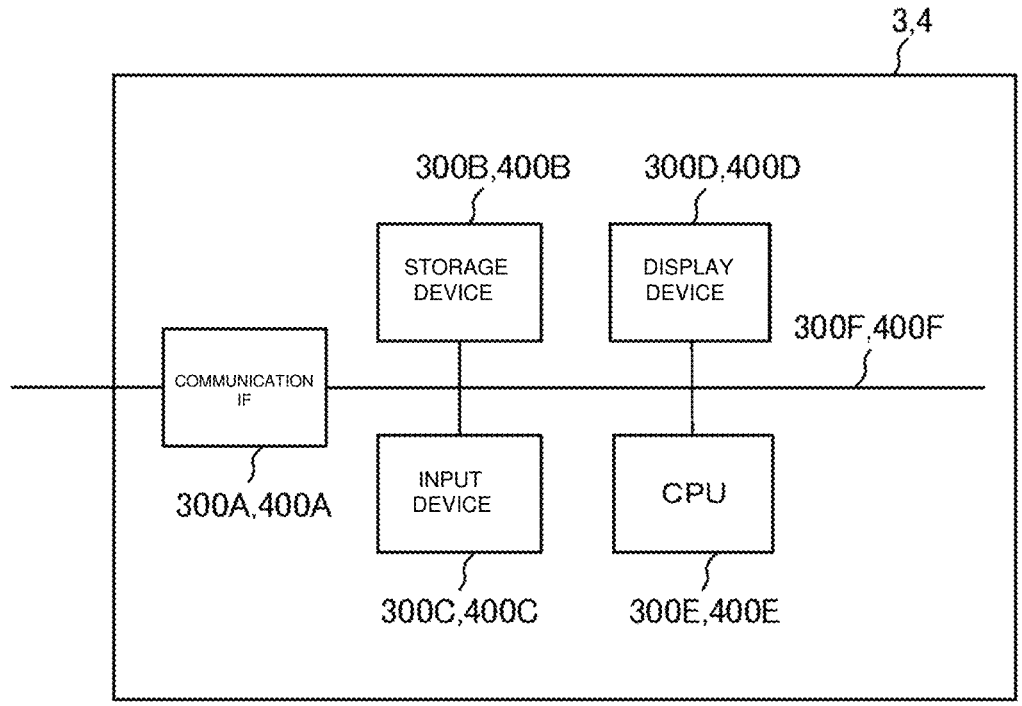
FIGS. 7A and 7B are a configuration diagram and a functional block diagram of user terminals according to the embodiment.
Figure 7B:
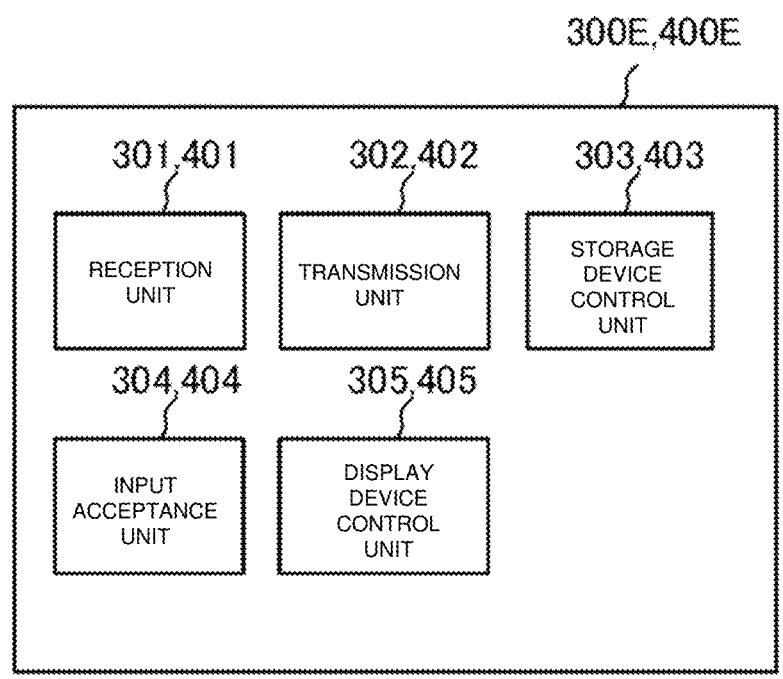

FIGS. 7A and 7B are configuration diagrams of the user terminals 3, 4. FIG. 7A shows the main hardware configuration of the user terminals 3, 4. The user terminals 3, 4 include communication IFs 300A, 400A, storage devices 300B, 400B, input devices 300C, 400C, display devices 300D, 400D, and CPUs 300E, 400E connected via buses 300F, 400F, respectively.

The communication IFs 300A, 400A are each an interface for establishing communication with other devices (in the present embodiment, the information processing server 2, the web server and others).

The storage devices 300B, 400B are each an HDD (Hard Disk Drive) or a semiconductor storage device (SSD (Solid State Drive)), for example. The storage devices 300B, 400B store user IDs, information processing programs and others. The user IDs are identifiers for identifying the user terminals 3, 4. By appending the user ID to the information transmitted from the user terminals 3, 4, the information processing server 2 can determine from what user terminals 3, 4 the received information has been transmitted. The user ID may be IP (Internet Protocol) address, MAC (Media Access Control) address or the like. Alternatively, the information processing server 2 may provide the user ID to each of the user terminals 3, 4.

The input devices 300C, 400C are, for example, input devices such as a keyboard or a mouse. So long as being capable of allowing the user to input, the input devices 300C, 400C may be other devices or equipment (e.g., a touchscreen). Voice input devices may be used.

The display devices 300D, 400D are, for example, liquid crystal displays, plasma displays, or organic EL displays. Other devices or equipment (e.g., CRT: Cathode Ray Tube) may be used so long as they can display.

The CPUs 300E, 400E control the user terminal 3 according to the present embodiment, and each include ROM and RAM which are not shown.

FIG. 7B is a functional block diagram of the user terminals 3, 4. As shown in FIG. 7B, the user terminals 3, 4 include the functions as reception units 301, 401, transmission units 302, 402, storage device control units 303, 403, input acceptance units 304, 404, display device control units 305, 405 and others, respectively. The functions in FIG. 7B are realized by the CPUs 300E, 400E executing the information processing programs stored in the storage devices 300B, 400B, respectively.

The reception units 301, 401 receive information transmitted from the information processing server 2.

The transmission units 302, 402 transmit, to the information processing server 2, the information corresponding to an input operation accepted by the input acceptance units 304, 404.

The storage device control units 303, 403 control the storage devices 300B, 400B, respectively. Specifically, the storage device control units 303, 403 write and read information by controlling the storage devices 300B, 400B, respectively.

The input acceptance units 304, 404 accept an input operation from the input devices 300C, 400C, respectively.

The display device control units 305, 405 control the display devices 300D, 400D, to display the information received by the reception units 301, 401 on the display devices 300D, 400D, respectively.

Information Processing

In the following, with reference to FIGS. 8 to 13, a description will be given of information processing in the information processing system 1. In the following description, configurations identical to those described with reference to FIGS. 1 to 7 are denoted by an identical reference sign, and the description thereof will not be repeated.

Airspace Registering Process

FIG. 8 is a flowchart of an example of an airspace registering process in the information processing system 1. In the following, with reference to FIG. 8, a description will be given of one example of the airspace registering process in the information processing system 1.

Step S101

Operating the input device 300C of the user terminal 3, a registered user inputs his/her attribute information. The attribute information input through the operations on the input device 300C is accepted by the input acceptance unit 304, and transmitted from the transmission unit 302 to the information processing server 2 via the network 5. The information from the user terminal 3 is received (accepted) by the reception unit 201 of the information processing server 2 and, according to an instruction from the registration unit 204, stored by the storage device control unit 203 in the user DB 1 in association with the user ID of the registered user.

Step S102

The registered user operates the input device 300C of the user terminal 3 to input information necessary to register an airspace. The information input through operations on the input device 300C is accepted by the input acceptance unit 304, and transmitted from the transmission unit 302 to the information processing server 2 via the network 5. The information from the user terminal 3 is received (accepted) by the reception unit 201 of the information processing server 2 and, according to an instruction from the registration unit 204, stored by the storage device control unit 203 in the airspace DB 2 in association with the user ID of the registered user.

The information necessary to register an airspace is such as those described in relation to the airspace DB 2, e.g., the zip code, prefecture, and postal address of the land, the latitude, longitude, and elevation of a representative point, the land type, area measurements, whether the information is public or private, the price (charge price/selling price), and additional information (such as environmental status) (including the status of the airspace). As described above, it is not necessary for the registered user to register every item of the status of the airspace; the registered user may register some of the items, and the administrator of the information processing system 1 or the information processing server 2 may register the remaining items.

Step S103

The registered user operates the input device 300C of the user terminal 3 to input sky domain name information. The information input through operations on the input device 300C is accepted by the input acceptance unit 304, and transmitted from the transmission unit 302 to the information processing server 2 via the network 5. The information from the user terminal 3 is received (accepted) by the reception unit 201 of the information processing server 2.

Step S104

The issuance unit 205 of the information processing server 2 issues the accepted sky domain. The registration unit 204 instructs the storage device control unit 203 to store the information in the airspace DB 2 in association with the user ID. Thus, the status of the airspace input by the registered user is stored in the airspace DB 2 in association with the sky domain name.

User Registering Process and Use Applying Process

Figure 9A:
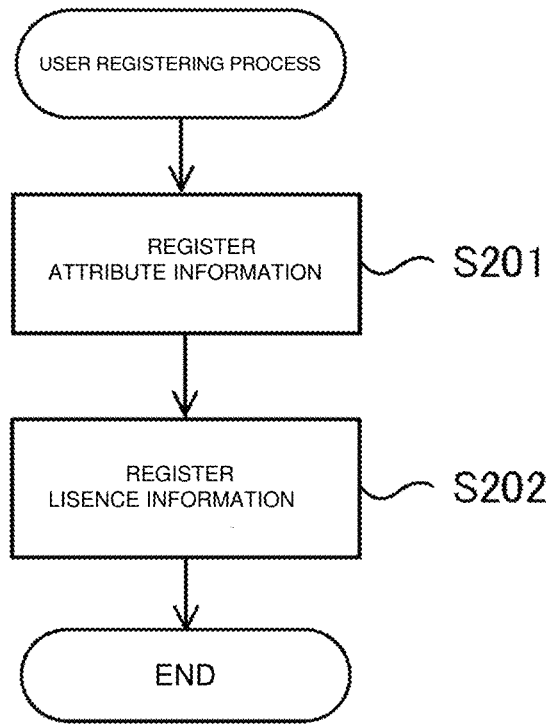
FIGS. 9A and 9B are flowcharts of one example of a user registering process and a use applying process in the information processing system according to the embodiment.
Figure 9B:
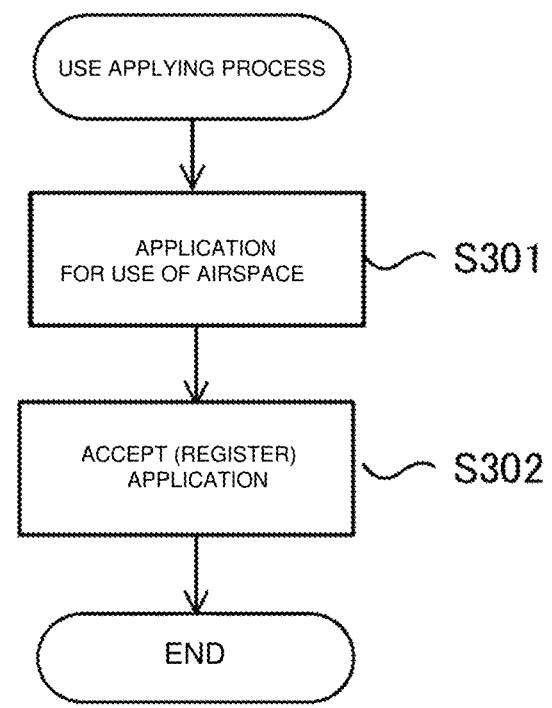

FIGS. 9A and 9B is a flowchart of one example of a user registering process and a use applying process in the information processing system 1. In the following, with reference to FIGS. 9A and 9B, a description will be given of one example of the user registering process and the use applying process in the information processing system 1.

Firstly, with reference to FIG. 9A, a description will be given of one example of the user registering process in the information processing system 1.

Step S201

A using user operates the input device 400C of the user terminal 4 to input his/her attribute information. The attribute information input through operations on the input device 400C is accepted by the input acceptance unit 404, and transmitted from the transmission unit 402 to the information processing server 2 via the network 5. The information from the user terminal 4 is received (accepted) by the reception unit 201 of the information processing server 2 and, according to an instruction from the registration unit 204, stored by the storage device control unit 203 in the user DB 1 in association with the user ID of the using user.

Step S202

The using user operates the input device 400C of the user terminal 4 to input information of any license he/she holds (e.g., information on the drone pilot license). The information input through operations on the input device 400C is accepted by the input acceptance unit 404, and transmitted from the transmission unit 402 to the information processing server 2 via the network 5. The information from the user terminal 4 is received (accepted) by the reception unit 201 of the information processing server 2 and, according to an instruction from the registration unit 204, stored by the storage device control unit 203 in the user DB 1 in association with the user ID of the using user.

Next, with reference to FIG. 9B, a description will be given of one example of the use applying process of the information processing system 1.

Step S301

The using user operates the input device 400C of the user terminal 4 to input airspace use application information. The use application information input through operations on the input device 400C is accepted by the input acceptance unit 404, and transmitted from the transmission unit 402 to the information processing server 2 via the network 5. Here, the use application information is such as those described in relation to the use application DB 3, e.g., airspace, use type (aerial photography, agriculture, transportation and others), use time period, air vehicle and the like.

Step S302

The information from the user terminal 4 is received (accepted) by the reception unit 201 of the information processing server 2 and, according to an instruction from the registration unit 204, stored by the storage device control unit 203 in the use application DB 3 in association with the user ID of the using user.

Assessing Process

Figure 10:
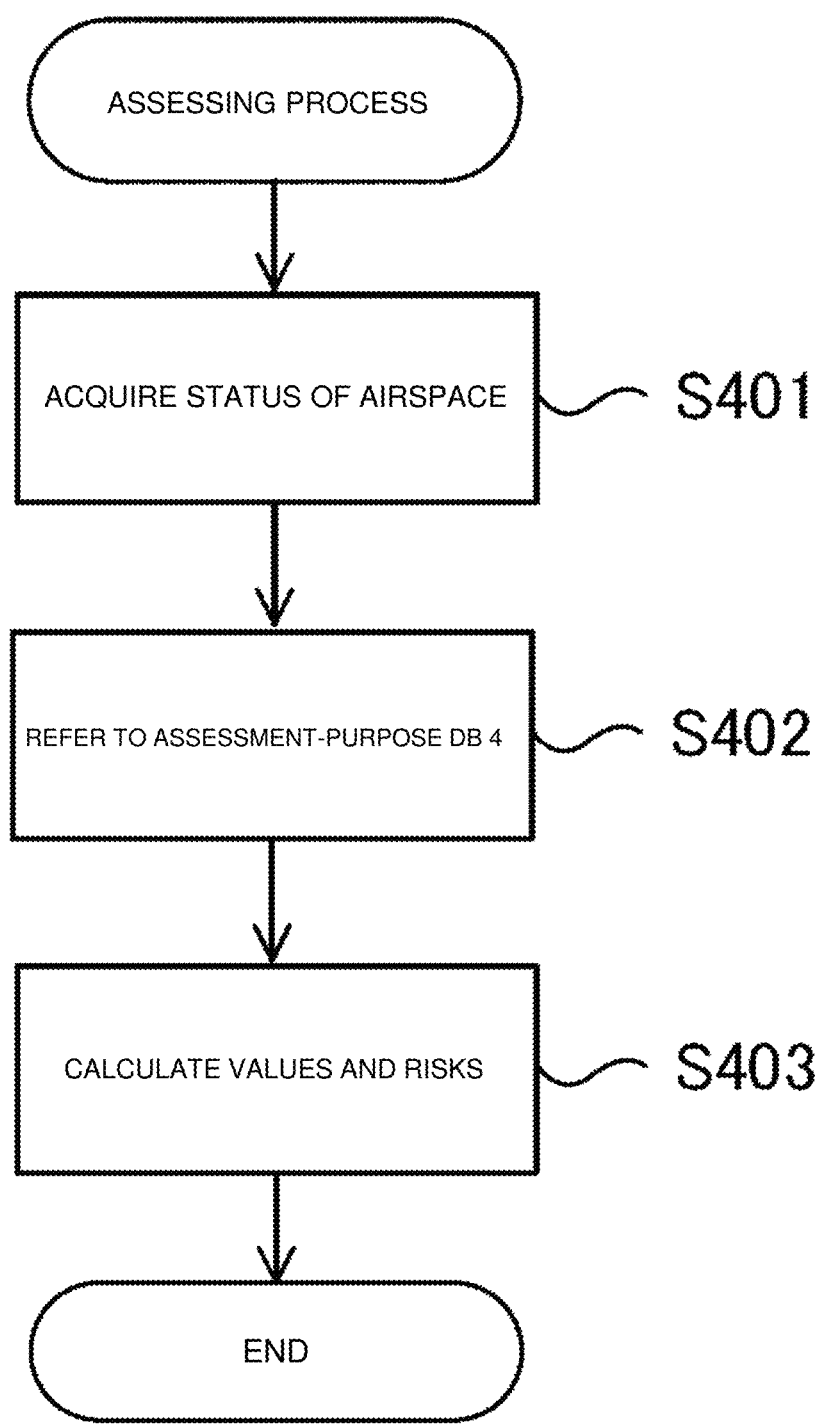
FIG. 10 is a flowchart of an example of an assessing process in the information processing system according to the embodiment.

FIG. 10 is a flowchart of one example of an assessing process in the information processing system 1. In the following, with reference to FIG. 10, a description will be given of one example of the assessing process in the information processing system 1.

Step S401

The assessment unit 207 of the information processing server 2 acquires the status of an airspace from the airspace DB 2. The status of an airspace is the items described in relation to the airspace DB, for example, the following items:
(1) Use type
(2) Geographic type
(3) Environment
(4) Meteorological status
(5) Utilization status
(6) Radio wave status
(7) Airport information
(8) Flight rule
(9) Statistical information
(10) Others Step S402

The assessment unit 207 refers to the assessment table stored in the assessment-purpose DB 4.

Step S403

The assessment unit 207 assesses an airspace according to the status of the airspace acquired in Step S401. Specifically, the assessment unit 207 acquires the value points and the risk points from the corresponding assessment-purpose DB 4 for each item of the acquired status of an airspace. Next, the assessment unit 207 adds up the acquired value points and risk points to obtain the values and risks of the airspace. More specifically, the assessment unit 207 refers to the assessment table stored in the assessment-purpose DB 4 and acquires the value points and the risk points of the corresponding minor items for each major item of the status of an airspace according to the status of the airspace acquired by the acquisition unit 206. Then, the assessment unit 207 adds up the acquired value points and the risk points to obtain the values and risks of the airspace.

In the description referring to FIG. 10, the assessment unit 207 assesses both the values and risks of an airspace. Here, the assessment unit 207 may assess one of the values and risks of an airspace. Alternatively, the user may be given the choice of assessing both the values and risks of an airspace or one of the values and risks of an airspace.

Reward Providing Process

Figure 11:
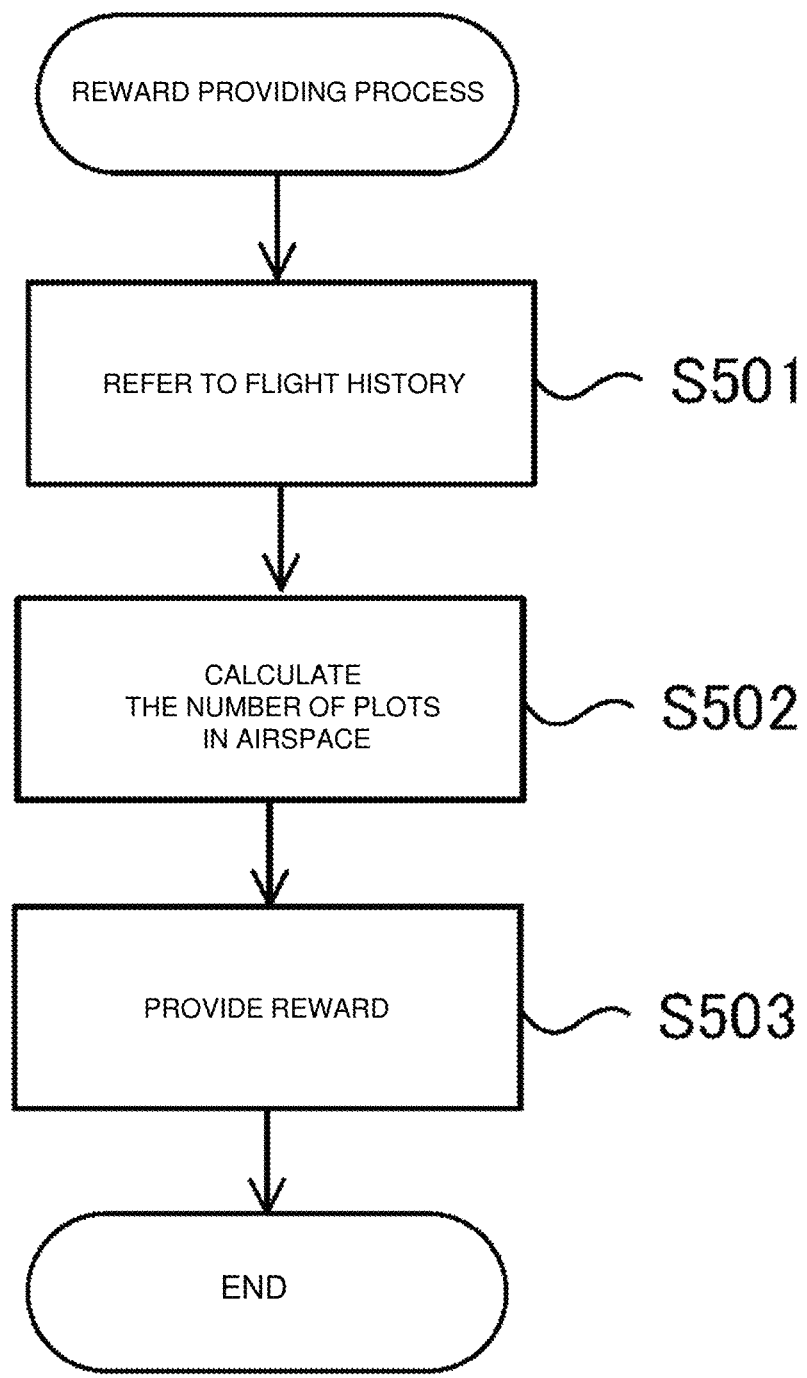
FIG. 11 is a flowchart of an example of a reward providing process in the information processing system according to the embodiment.

FIG. 11 is a flowchart of one example of a reward providing process in the information processing system 1. In the following, with reference to FIG. 11, a description will be given of an example of the reward providing process in the information processing system 1.

Step S501

The acquisition unit 206 of the information processing server 2 refers to the usage history stored in the user DB 1 of the information processing server 2, and acquires periodical positional information (plots) of an air vehicle.

Step S502

The reward providing unit 208 counts the number of plots of the positional information in each airspace, according to the periodic positional information of an air vehicle acquired by the acquisition unit 206.

Step S503

The reward providing unit 208 provides a reward (e.g., points) to each airspace according to the plot count.

The reward providing unit 208 may provide a reward to each airspace (e.g., points) according to at least one of the number of pieces of periodical positional information (the number of plots) of an air vehicle acquired by the acquisition unit 206 and the values and risks of the airspace assessed by the assessment unit 207. In this case, the provided reward may be adjusted by a coefficient calculated according to at least one of the values and risks of the airspace assessed by the assessment unit 207.

Route Searching Process

Figure 12:
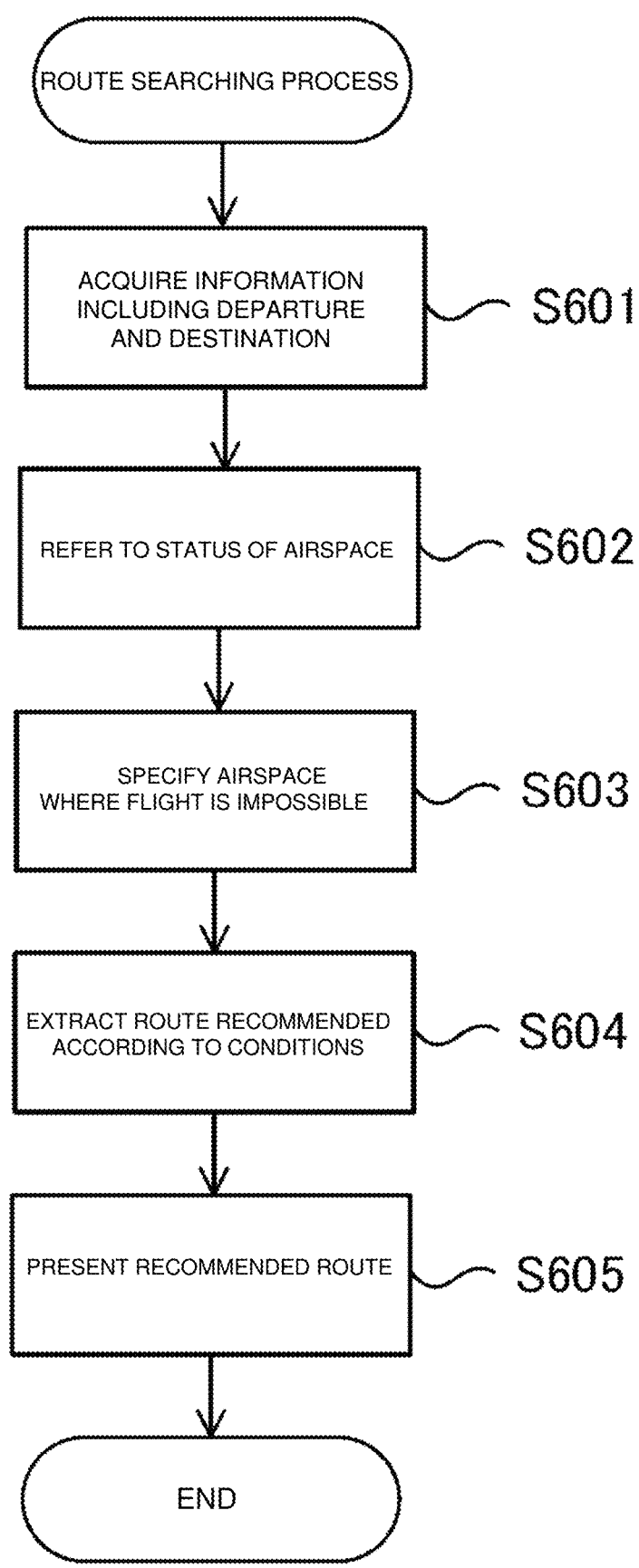
FIG. 12 is a flowchart of one example of a route searching process in the information processing system according to the embodiment.

FIG. 12 is a flowchart of one example of a route searching process in the information processing system 1. In the following, with reference to FIG. 12, a description will be given of one example of the route searching process in the information processing system 1.

Step S601

The acquisition unit 206 of the information processing server acquires information on an air vehicle for which use has been applied, the use time period, and the departure and destination of the air vehicle.

Step S602

The search unit 209 refers to the status of an airspace stored in the airspace DB 2, and starts searching for the optimum route according to the information acquired by the acquisition unit 206, i.e., the air vehicle for which use has been applied, the use time period, and the departure and destination of the air vehicle.

Step S603

The search unit 209 refers to the status of an airspace stored in the airspace DB 2, and specifies any unavailable airspace by the information on the air vehicle for which use has been applied, the use time period, and the status of an airspace.

Step S604

The search unit 209 searches for the optimum route of the air vehicle excluding the airspace specified in Step S603. Specifically, the search unit 209 searches for the optimum route for each of the cases, such as a route that prioritizes the usage fee (the cheapest route; in other words, the route with the lowest value points), a route that prioritizes quickness (the route with the shortest time), and a route with the lowest risks.

Step S605

The search unit 209 presents, to the using user applied for use, the information on the optimum route searched for each of cases (hereinafter referred to also as the route information). Specifically, the search unit 209 instructs the transmission unit 202 to transmit the route information to the user terminal 4 of the using user applied for use. The transmission unit 202 transmits the route information to the user terminal 4 of the using user applied for use. The transmitted route information is received by the reception unit 401 of the user terminal 4 of the using user, and the display device control unit 405 displays the route information on the display device 400D.

Here, the using user may be allowed to choose the prioritized item (quickness, usage fee or the like), and then the search unit 209 may search for the route optimum for the selected item and present the result to the using user.

Route assessing process

Figure 13:
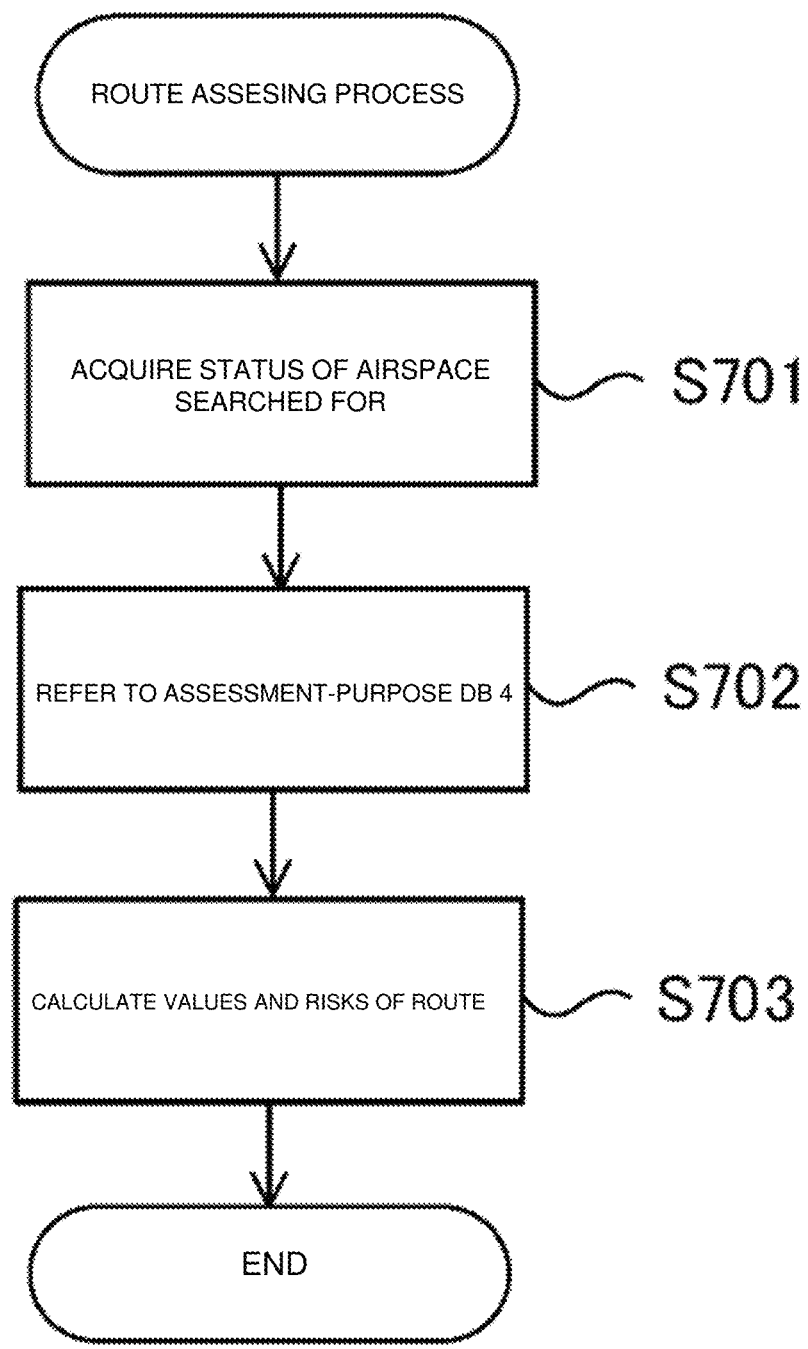
FIG. 13 is a flowchart of one example of a route assessing process in the information processing system according to the embodiment.

FIG. 13 is a flowchart of one example of a route assessing process in the information processing system 1. In the following, with reference to FIG. 13, a description will be given of one example of the route assessing process in the information processing system 1.

Step S701

The assessment unit 207 of the information processing server 2 refers to the status of airspaces in the route searched by the search unit 209 through the airspace DB 2.

Step S702

The assessment unit 207 refers to the assessment table stored in the assessment-purpose DB 4.

Step S703

The assessment unit 207 assesses the values and risks of the route according to the status of the airspaces acquired in Step S701 and the information on the assessment table stored in the assessment-purpose DB 4. Specifically, the assessment unit 207 acquires corresponding value points and risk points from the assessment-purpose DB 4 for each item of the status of airspaces forming the route. Next, the assessment unit 207 adds up the acquired value points and risk points to obtain the values and risks of the route. The assessment of the retrieved route can be used in calculating the usage fee or insurance for an air vehicle that uses the airspaces in the route.

As described above, the information processing server 2 according to the present embodiment is an information processing device for assessing an airspace. The information processing server 2 includes: the acquisition unit 206 (first acquisition unit) that acquires the status of an airspace; and the assessment unit 207 that assesses at least one of the values and risks of the airspace according to the status of the airspace acquired by the acquisition unit 206 by referring to the assessment-purpose DB 4 storing information which is for assessing at least one of the values and risks of an airspace and associated with the status of the airspace. Thus, the present embodiment is useful in calculating the usage fee or insurance for an air vehicle that uses airspaces in a route, and thus facilitates airspace utilization.

The information processing server 2 further includes the reception unit 201 (acceptance unit) that accepts a registration application for an airspace and the status of the airspace, and the registration unit 204 that registers the airspace for which registration has been applied and the status of the airspace in association with each other. The acquisition unit 206 (first acquisition unit) acquires the status of the airspace having been registered. That is, the assessment unit 207 assesses at least one of the values and risks of an airspace according to the status of the registered airspace acquired by the acquisition unit 206. This is expected to facilitate registration of an airspace.

The status of an airspace includes the use type of the airspace, such as aerial photography, agriculture, transportation, leisure, official and others. The assessment unit 207 of the information processing server 2 assesses at least one of the values and risks of the airspace according to the use type of the airspace. Thus, the accuracy in assessing the values and risks of an airspace improves by considering the use type of the airspace.

The status of an airspace includes the geographic type of the airspace, such as urban area, forested area, and agricultural land. The assessment unit 207 of the information processing server 2 assesses at least one of the values and risks of an airspace according to the geographic type of the airspace. Thus, the accuracy in assessing the values and risks of an airspace improves by considering the geographic type of the airspace.

The status of an airspace includes the radio wave status of the airspace, such as radio wave strength, frequencies, and radio wave certifications. The assessment unit 207 of the information processing server 2 assesses at least one of the values and risks of the airspace according to the radio wave status of the airspace. Thus, the accuracy in assessing the values and risks of an airspace improves by considering the radio wave status of the airspace.

The status of an airspace includes the utilization status of the airspace. The assessment unit 207 of the information processing server 2 assesses at least one of the values and risks of the airspace according to the utilization status of the airspace. Thus, the accuracy in assessing the values and risks of an airspace improves by considering the utilization status of the airspace.

The utilization status includes at least one of the number of use applications of the airspace, the number of air vehicles that fly in the airspace, the use time period of the airspace, and the range of the airspace. Thus, the accuracy in assessing the values and risks of an airspace improves by considering the number of use applications and others of the airspace.

The status of an airspace includes the number and details of accidents of air vehicles occurred in the airspace. The assessment unit 207 of the information processing server 2 assesses at least one of the values and risks of the airspace according to the number and details of accidents of air vehicles occurred in the airspace. Thus, the accuracy in assessing the values and risks of an airspace improves by considering the number and details of accidents of air vehicles.

The status of an airspace includes the environmental status of the airspace, such as the presence/absence of obstructions and special facilities. The assessment unit 207 of the information processing server 2 assesses at least one of the values and risks of the airspace according to the environmental status of the airspace. Thus, the accuracy in assessing the values and risks of an airspace improves by considering the environmental status of the airspace.

The status of an airspace includes the meteorological status of the airspace. The assessment unit 207 of the information processing server 2 assesses at least one of the values and risks of the airspace according to the meteorological status. Thus, the accuracy in assessing the values and risks of an airspace improves by considering the meteorological status of the airspace.

The status of an airspace includes the use time period of the airspace. The assessment unit 207 of the information processing server 2 assesses at least one of the values and risks of the airspace according to the use time period. Thus, the accuracy in assessing the values and risks of an airspace improves by considering the use time period of the airspace.

The information processing server 2 includes the acquisition unit 206 (second acquisition unit) that acquires the positional information of an air vehicle that uses an airspace, and the reward providing unit 208 that provides, according to the acquired positional information of the air vehicle, a reward to the airspace that is used by the air vehicle. In this manner, not the registrant of the airspace but the airspace itself is rewarded. Therefore, when an airspace with no registrant is used and the landowner or naming right holder of the land corresponding to the airspace is identified later, the reward given to the airspace can be transferred to the identified landowner or naming right holder at that time point.

The acquisition unit 206 (third acquisition unit) of the information processing server 2 acquires positional information on departure and destination of an air vehicle that uses an airspace. The information processing server 2 includes the search unit 209 that searches for an airspace where use of the air vehicle is recommended according to at least one of the values and risks of the airspace assessed by the assessment unit 207. This realizes optimum routing (route) by considering the values and risks of the airspaces included in the route.

Variation 1 of Embodiment

In the embodiment described above, the values and risks of an airspace is assessed according to the status of the airspace. Here, an air vehicle that uses an airspace may be assessed. In this case, similarly to the assessment-purpose DB 4 for airspaces, an assessment-purpose DB for air vehicles is provided. FIG. 14 is an example of assessment information stored in the air vehicle assessment-purpose DB.

The air vehicle assessment-purpose DB stores information for assessing the values and risks of an air vehicle (hereinafter referred to also as the assessment information). As shown in FIG. 14, the air vehicle assessment information is a data table where points of values and risks (hereinafter referred to also as the value points and the risk points) are associated with each item of the air vehicle information. More specifically, items such as the body size of the air vehicle (size), the number of rotors, the weight of the body (dry weight), the payload (payload), the attribute, and the type of load (e.g., whether it is a specified dangerous goods or not) each have a major item and minor items, and the value points and the risk points are associated. The air vehicle assessment is carried out by acquiring the points of minor items corresponding to the air vehicle information for each major item. For example, when the air vehicle size (major item) is large (minor item), 5 and 4 points are acquired as the corresponding value points and risk points, respectively. In the variation 1 of the present embodiment, the value points and the risk points are set so that their being higher means higher values and risks. Here, the value points and the risk points may be set so that their being lower means higher values and risks.

The assessment unit 207 of the information processing server 2 according to the variation 1 of the embodiment assesses at least one of the values and risks of an air vehicle itself according to the value points and risk points of the air vehicle. More specifically, the acquisition unit 206 (fourth acquisition unit) acquires information on an air vehicle that uses an airspace from the use application DB 3, and the assessment unit 207 refers to the air vehicle assessment table and acquires the value points and risk points of the corresponding minor item from the air vehicle assessment table for each major item of the information on an air vehicle that uses an airspace acquired by the acquisition unit 206. Then, the assessment unit 207 adds up the acquired value points and risk points to obtain the values and risks of the air vehicle.

Here, at least one of the values and risks of an air vehicle that uses any route may be assessed. In this case, the acquisition unit 206 acquires the status of airspaces forming the route from the airspace DB 2. Then, the assessment unit 207 refers to the assessment table stored in the assessment-purpose DB 4, and acquires the value points and the risk points for each corresponding minor item from the assessment table for each major item of the status of each airspace. The assessment unit 207 then adds up the acquired value points and risk points to obtain the value points and risk points of the route.

Next, the acquisition unit 206 (fourth acquisition unit) acquires information on the air vehicle that uses an airspace from the use application DB 3. The assessment unit 207 refers to the air vehicle assessment table, and acquires the value points and the risk points of the corresponding minor item information from the air vehicle assessment table for each major item of the information on the air vehicle that uses each airspace acquired by the acquisition unit 206. Then, the assessment unit 207 adds up the acquired value points and risk points to obtain the value points and risk points of the air vehicle.

Then, the assessment unit 207 adds up thus calculated assessments (value points and risk points) of the route and the air vehicle to obtain the assessment (value points and risk points) of the air vehicle that uses the route. Here, the present invention is not limited to simply adding up the value points and risk points of the airspaces forming the route and the air vehicle that uses the airspaces to obtain the value points and risk points of the air vehicle that uses the route. Using one of the value points and risk points of the route or the air vehicle as a coefficient, the other one of the value points and the risk points may be multiplied by the coefficient. Then, the results may be added up to provide the value points and risk points of the air vehicle that uses any route. At least one of the values and risks of an air vehicle that uses any route assessed in this manner can be used in calculating the usage fee or insurance of the air vehicle that uses airspaces of any route.

The acquisition unit 206 (fourth acquisition unit) of the information processing server 2 acquires information on an air vehicle that uses an airspace. The assessment unit 207 of the information processing server 2 assesses at least one of the values and risks of the air vehicle according to the information on the air vehicle that uses the airspace acquired by the acquisition unit 206 by referring to the air vehicle assessment table which is information for assessing at least one of the values and risks of an air vehicle and associated with the air vehicle. This can be used in calculating the usage fee or insurance of an air vehicle, and thus facilitates use of an airspace.

The information of an air vehicle includes at least one of the weight, output, load, and use time period of the air vehicle. The assessment unit 207 of the information processing server 2 assesses at least one of the values and risks of the air vehicle according to at least one of the weight, output, load, and use time period of the air vehicle. Thus, the accuracy in assessing at least one of the values and risks of an air vehicle improves by considering the weight, output, load, use time period of the air vehicle.

In the present embodiment and its variation 1, the acquisition unit 206 of the information processing server 2 acquires the following information (1) to (5):

(1) The status of a registered airspace;
(2) The meteorological status of an airspace;
(3) The positional information of an air vehicle that uses an airspace;
(4) The departure and destination positional information of an air vehicle that uses an airspace; and
(5) The information on an air vehicle.

Here, it is not necessary for the one acquisition unit to acquire information (1) to (5), and acquisition units as separate functions may acquire the information pieces. For example, a first acquisition unit may acquire information (1) and (2); a second acquisition unit may acquire information (3); a third acquisition unit may acquire information (4); and a fourth acquisition unit may acquire information (5). The acquisition unit 206 (first to fourth acquisition units) is not necessarily included in the information processing server 2. Other device (device) may acquire and transmit information to the information processing server 2. In this case, the first to fourth acquisition units may be included in the other device (device).

Variation 2 of Embodiment

The status of an airspace may change over time. Therefore, it is preferable to acquire the status of an airspace regularly or irregularly and update the status of the airspace if there is any change. Here, the information processing server 2 may include: an acquisition unit that acquires the status of an airspace; a comparison unit that compares the status of the airspace acquired by the acquisition unit against the status of the airspace stored in the airspace DB 2; and an update unit that updates, upon a difference (change) in the comparison by the comparison unit, the status of the airspace with the difference to reflect the status of the airspace acquired by the acquisition unit. Alternatively, the status of an airspace may be updated by the administrator of the information processing system 1 or the user. In this case, the information processing server 2 should include: an acquisition unit that acquires a status of an airspace input by the administrator of the information processing system 1 or the user; a comparison unit that compares the status of the airspace acquired by the acquisition unit against the status of the airspace stored in the airspace DB 2; and an update unit that updates, upon a difference (change) in the comparison by the comparison unit, the status of the airspace with the change to reflect the status of the airspace acquired by the acquisition unit.

Variation 3 of Embodiment

In the embodiment, the assessment unit 207 assesses the values and risks of an airspace according to the assessment information (the assessment table where the value points and the risk points are associated for each item of the status of an airspace), which is stored in the assessment-purpose DB 4, for assessing at least one of the values and risks of an airspace and associated with the status of the airspace. Here, the value points and the risk points may not be fixed but calculated through an algorithm using a statistical scheme. When a data table where a coefficient is associated with each item of the status of an airspace is to be provided, the coefficient may be calculated through an algorithm using a statistical scheme. This algorithm using a statistical scheme is also included in the information which is for assessing at least one of the values and risks of an airspace and associated with the status of the airspace.

In the variation 1 of the embodiment, the assessment unit 207 assesses the values and risks of an air vehicle according to information (the assessment table where value points and risk points are associated for each item of the information on the air vehicle), which is stored in the air vehicle assessment-purpose DB, for assessing the values and risks of the air vehicle. Here, the value points and the risk points may not be fixed but calculated through an algorithm using a statistical scheme. When a data table where a coefficient is associated with each item of the air vehicle is to be provided, the coefficient may be calculated through an algorithm using a statistical scheme. This algorithm using a statistical scheme is also included in the information which is for assessing at least one of the values and risks of an airspace and associated with the air vehicle.

Variation 4 of Embodiment

In assessing an airspace, the assessment unit 207 may assess the value points of the airspace in linkage with the value points of the surrounding airspace. For example, when the status of an adjacent airspace changes (e.g., the population has increased), the assessment unit 207 may raise (increase) the value points of the target airspace in linkage with the adjacent value points. In this case, the assessment unit 207 may multiply the value points of the assessment target airspace by a coefficient so as to raise the value points of the assessment target airspace according to the distance between the assessment target airspace and the adjacent airspace (the closer the distance, the larger the coefficient; the farther the distance, the smaller the coefficient, where the coefficient>1).

In assessing an airspace, the assessment unit 207 may assess the value points in linkage with the air transportation fee of an air vehicle that uses the airspace. In this case, the assessment unit 207 may multiply the value points of the assessment target airspace by a coefficient so as to raise or reduce the value points of the assessment target airspace according to the air transportation fee of an air vehicle that uses the assessment target airspace (the higher the air transportation fee, the larger the coefficient; the lower the air transportation fee, the smaller the coefficient).

INDUSTRIAL APPLICABILITY

The information processing device, the information processing method, and the information processing program can assess the values of an airspace to facilitate use of the airspace. In addition, the information processing device, the information processing method, and the information processing program can assess the risks of an airspace for use in calculating insurance and others of an air vehicle.

REFERENCE SIGNS LIST

1 information processing system
2 information processing server (information processing device)
200A communication IF
200B storage device
200C CPU
200D bus (BUS)
201 reception unit (acceptance unit)
202 transmission unit
203 storage device control unit
204 registration unit
205 issuance unit
206 acquisition unit 206 (first to fourth acquisition units)
207 assessment unit
208 reward providing unit
209 search unit
210 settlement unit
3,4 user terminal
300A, 400A communication IF
300B, 400B storage device
300C, 400C input device
300D, 400D display device
300E, 400E CPU
300F, 400F bus (BUS)
301, 401 reception unit
302, 402 transmission unit
303, 403 storage device control unit
304, 404 input acceptance unit
305, 405 display device control unit
5 network
DB1 user database
DB2 airspace database
DB3 assessment-purpose database

The invention claimed is:
1. An information processing device for assessing an airspace, comprising:
a first acquisition unit that acquires a status of an airspace;
an assessment unit that assesses at least one of values and risks of the airspace according to the status of the airspace acquired by the first acquisition unit by refer- ring to information which is for assessing at least one of values and risks of an airspace and associated with a status of the airspace;
a second acquisition unit that acquires positional information of an air vehicle that uses an airspace; and
a reward providing unit that provides, according to the acquired positional information of the air vehicle, a reward to the airspace that is used by the air vehicle.

2. The information processing device according to claim 1, further comprising:
an acceptance unit that accepts a registration application for an airspace and the status of the airspace; and
a registration unit that registers the airspace for which registration has been applied and the status of the airspace in association with each other, wherein
the first acquisition unit acquires the status of the airspace having been registered.

3. The information processing device according to claim 1, wherein
the status of an airspace includes a use type of the airspace, and
the assessment unit assesses at least one of the values and risks of the airspace according to the use type of the airspace.

4. The information processing device according to claim 1, wherein
the status of an airspace includes a geographic type of the airspace, and
the assessment unit assesses at least one of the values and risks of the airspace according to the geographic type of the airspace.

5. The information processing device according to claim 1, wherein
the status of an airspace includes a radio wave status of the airspace, and
the assessment unit assesses at least one of the values and risks of the airspace according to the radio wave status of the airspace.

6. The information processing device according to claim 1, wherein
the status of an airspace includes a utilization status of the airspace, and
the assessment unit assesses at least one of the values and risks of the airspace according to the utilization status of the airspace.

7. The information processing device according to claim 6, wherein
the utilization status includes at least one of the number of use applications for the airspace, the number of air vehicles that fly in the airspace, a use time period of the airspace, and a range of the airspace.

8. The information processing device according to claim 1, wherein
the status of an airspace includes the number and details of accidents of air vehicles occurred in the airspace, and
the assessment unit assesses at least one of the values and risks of the airspace according to the number and details of accidents of air vehicles occurred in the airspace.

9. The information processing device according to claim 1, wherein
the status of an airspace includes an environmental status of the airspace, and
the assessment unit assesses at least one of the values and risks of the airspace according to the environmental status of the airspace.

10. The information processing device according to claim 1, wherein
the status of an airspace includes a meteorological status of the airspace, and
the assessment unit assesses at least one of the values and risks of the airspace according to the meteorological status.

11. The information processing device according to claim 1, wherein
the status of an airspace includes a use time period of the airspace, and
the assessment unit assesses at least one of the values and risks of the airspace according to the use time period.

12. The information processing device according to claim 1, further comprising:
a third acquisition unit that acquires positional information on departure and destination of an air vehicle that uses an airspace; and
a search unit that searches for an airspace where use of the air vehicle is recommended according to at least one of the values and risks of the airspace assessed by the assessment unit.

13. The information processing device according to claim 1, further comprising:
a fourth acquisition unit that acquires information on an air vehicle that uses an airspace, wherein
the assessment unit assesses at least one of the values and risks of the air vehicle according to the information on the air vehicle that uses the airspace acquired by the fourth acquisition unit by referring to information which is for assessing at least one of values and risks of an air vehicle and associated with the air vehicle.

14. The information processing device according to claim 13, wherein
the information on the air vehicle includes at least one of weight, output, load, and use time period of the air vehicle, and
the assessment unit assesses at least one of the values and risks of the air vehicle according to at least one of the weight, output, load, and use time period of the air vehicle.

15. An information processing method for assessing an airspace, comprising:
acquiring a status of an airspace;
assessing at least one of values and risks of the airspace according to the acquired status of the airspace by referring to information which is for assessing at least one of values and risks of an airspace and associated with a status of the airspace;
acquiring positional information of an air vehicle that uses an airspace; and
providing, according to the acquired positional information of the air vehicle, a reward to the airspace that is used by the air vehicle.

16. The information processing method according to claim 15, further comprising:
accepting a registration application for an airspace and the status of the airspace; and
registering the airspace for which registration is applied and the status of the airspace in association with each other, wherein
in the acquiring the status of an airspace, the status of the airspace having been registered is acquired.

17. A non-transitory storage medium for an information processing program for assessing an airspace, the storage medium having stored therein an information processing program that causes a computer to function as:

an acquisition unit that acquires a status of an airspace;
an assessment unit that assesses at least one of values and risks of the airspace according to the status of the airspace acquired by the acquisition unit by referring to information which is for assessing at least one of values and risks of an airspace and associated with a status of the airspace;
a second acquisition unit that acquires positional information of an air vehicle that uses an airspace; and
a reward providing unit that provides, according to the acquired positional information of the air vehicle, a reward to the airspace that is used by the air vehicle.

\* \* \* \* \*